(12) United States Patent
Burdock

(10) Patent No.: US 6,206,383 B1
(45) Date of Patent: Mar. 27, 2001

(54) HYDRAULIC CONTROL SYSTEMS

(75) Inventor: William Burdock, Sutton Coldfield (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/320,066

(22) Filed: May 26, 1999

(30) Foreign Application Priority Data

Jun. 9, 1998 (GB) .................................. 9812274

(51) Int. Cl.$^7$ .......................... B60G 17/01; B60G 21/045
(52) U.S. Cl. ..................................... 280/5.508; 280/5.506
(58) Field of Search ............................. 280/5.508, 5.506, 280/5.52, 5.521, 5.501, 124.106, 124.159, 124.161, 124.16, FOR 171

(56) References Cited

U.S. PATENT DOCUMENTS

| | | | |
|---|---|---|---|
| 5,020,826 | * 6/1991 | Stecklein et al. | 280/707 |
| 5,085,460 | 2/1992 | Takahashi | 280/707 |
| 5,092,625 | 3/1992 | Kawabata | 280/707 |
| 5,116,069 | * 5/1992 | Miller | 280/112.2 |
| 5,161,822 | * 11/1992 | Lund | 280/772 |
| 5,199,854 | 4/1993 | Aoyama . | |
| 5,219,181 | * 6/1993 | Lund | 280/772 |
| 5,230,529 | * 7/1993 | Harvey-Bailey | 280/707 |
| 5,362,094 | * 11/1994 | Jensen | 280/689 |
| 5,443,283 | * 8/1995 | Hawkins et al. | 280/709 |
| 5,529,324 | 6/1996 | Krawczyk et al. | 280/772 |
| 5,579,229 | 11/1996 | Maguran, Jr. | 280/707 |
| 5,597,180 | 1/1997 | Ganzel | 280/772 |
| 5,630,623 | * 5/1997 | Ganzel | 280/772 |

FOREIGN PATENT DOCUMENTS

| | | |
|---|---|---|
| 0392508A1 | 4/1990 | (EP) . |
| 0 512 358 A1 | 11/1992 | (EP) . |
| 0512358 | 11/1992 | (EP) . |
| 0 783 986 A2 | 7/1997 | (EP) . |
| 2304652A | 3/1997 | (GB) . |
| 80/00821 | 5/1980 | (WO) . |
| 98/26948 | 6/1998 | (WO) . |
| WO 98/26948 | 6/1998 | (WO) . |

OTHER PUBLICATIONS

Japanese Abstract, (M–1098), vol. 015, No. 129 dated Mar. 28, 1991 & JP 03 014712A to Toyota Motor Corp. dated Jan. 23, 1991.
Japanese Abstract, (M–1105), vol. 015, No. 160 dated Apr. 22, 1991 & JP 03 031015A to Toyota Motor Corp dated Feb. 8, 1991.
Japanese Abstract, (M–1539), vol. 018, No. 013 dated Jan. 11, 1994 & JP 05 254323 A to Aisin Seiki Co., Ltd. dated Oct. 5, 1993.
Japanese Abstract, vol. 095, No. 011 dated Dec. 26, 1995 & JP 07 228118A to Aisin Seiki Co., Ltd. dated Aug. 29, 1995.
Japanese Abstract, vol. 098, No. 010 dated Aug. 31, 1998 & JP 10 119529 A to Tokico Ltd. dated May 12, 1998.

* cited by examiner

Primary Examiner—Brian L. Johnson
Assistant Examiner—Tony Winner
(74) Attorney, Agent, or Firm—Davis & Bujold, P.L.L.C.

(57) ABSTRACT

A vehicle suspension system comprising a hydraulic roll control actuator 4 controlled by a hydraulic circuit 10. The circuit 10 includes a valve block having a pressure line 18a supplied by a pump 12 and a return line 20a, and a pressure control valve 22 for controlling the flow of hydraulic fluid from the pressure line 18a to the return line 20 to control the hydraulic pressure drop between them. Two actuation control valves 24, 26 allow connection of the actuators between the pressure and return lines to control the actuating force produced by the actuators. A control unit 30 is arranged to connect the actuators 4 only when the desired actuating force is greater than a minimum value corresponding to a minimum pressure drop which can be produced by the pressure control valve 22, and to determine the minimum pressure drop from measurement of the temperature of a part of the hydraulic system.

4 Claims, 3 Drawing Sheets

HYDRAULIC CONTROL SYSTEMS

FIELD OF THE INVENTION

The present invention relates to hydraulically actuated suspension control systems for vehicles, and in particular for roll control systems.

BACKGROUND OF THE INVENTION

It is known, for example from WO 98/26948, EP 0 512 358 and U.S. Pat. No. 5,529,324, to provide roll control systems. In particular it is known from U.S. Pat. No. 5,529,324 to disclose a vehicle suspension system comprising a hydraulic actuator, a source of hydraulic pressure and a drain, a pressure control valve for controlling the flow of hydraulic fluid from the source to the drain thereby to control the hydraulic pressure drop between the source and the drain, at least one actuation control valve for connecting the actuator between the source and the drain such that said pressure drop controls the magnitude of an actuating force produced by the actuator, and control means arranged to operate the valves in response to at least one input defining a desired actuating force.

However it can be a problem with such systems that the pressure control valve, even when fully open, creates a minimum pressure drop across itself defined partly by the cross section of the flow path through the valve when open and partly the viscosity of the fluid. Therefore a minimum pressure which can be applied across the actuator and a minimum roll control correction force which can therefore be applied. The present invention aims to minimize this problem.

SUMMARY OF THE INVENTION

The present invention provides a vehicle suspension system comprising a hydraulic actuator, a source of hydraulic pressure and a drain, a pressure control valve for controlling the flow of hydraulic fluid from the source to the drain thereby to control the hydraulic pressure drop between the source and the drain, at least one actuation control valve for connecting the actuator between the source and the drain such that said pressure drop controls the magnitude of an actuating force produced by the actuator, and control means arranged to operate the valves in response to at least one input defining a desired actuating force, wherein the control means is arranged to connect the actuator only when the desired actuating force is greater than a minimum value corresponding to a minimum pressure drop which can be produced by the pressure control valve, and to determine the minimum pressure drop from measurement of the temperature of a part of the hydraulic system.

Preferably the control means is arranged to obtain the measurement of said temperature by monitoring a temperature dependent characteristic of the drive current by which it controls at least one of the valves. Alternatively a separate thermometer can be provided.

Preferably the actuator is a roll control actuator arranged to control roll of a vehicle and the value of the minimum actuating force defines a deadband of low lateral accelerations for which roll control cannot be provided.

Preferred embodiments of the present invention will now be described by way of example only with reference to the accompanying drawings.

DESCRIPTION OF THE PREFERRED EMBODIMENTS

Figure 1:
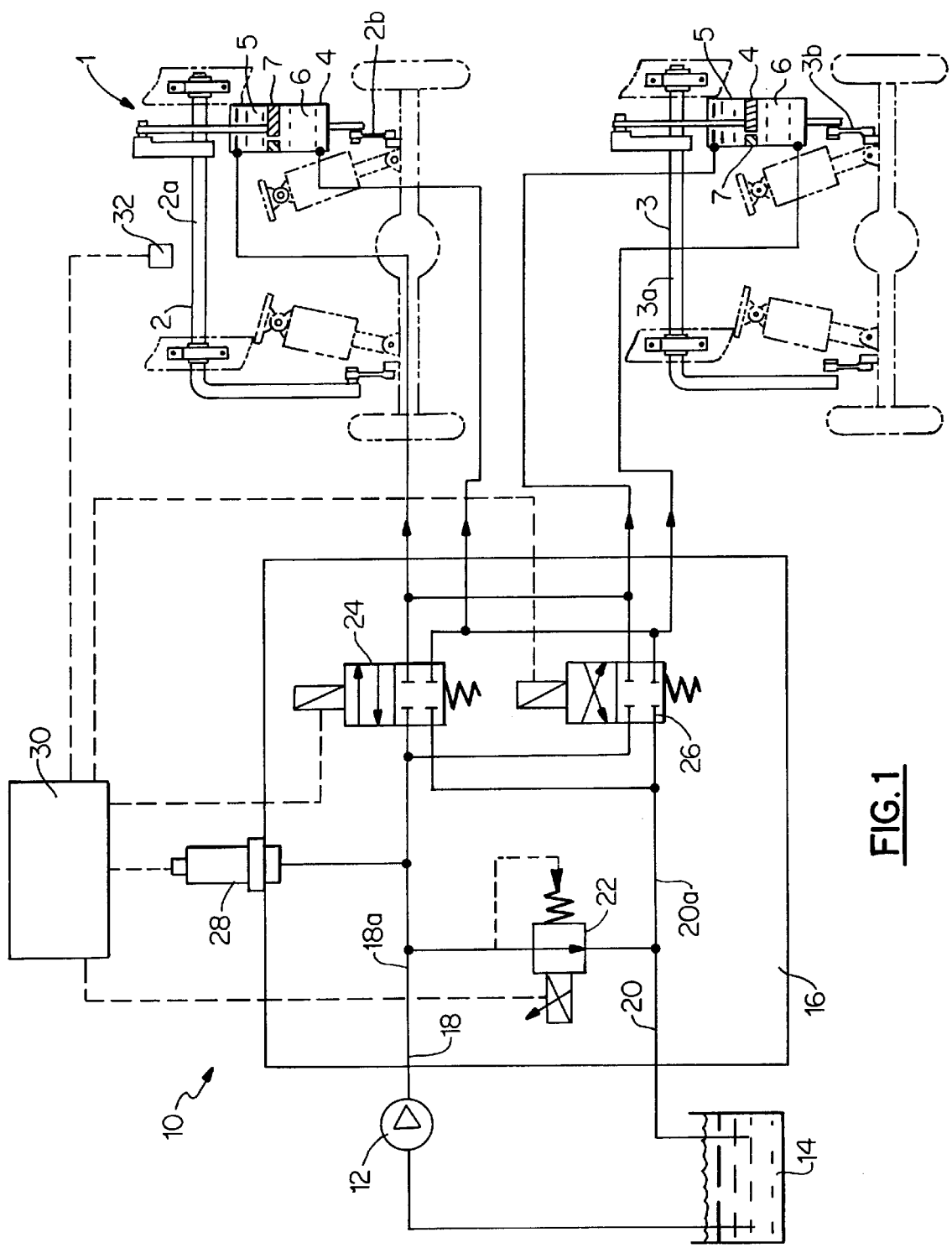
FIG. 1 is a diagrammatic representation of a hydraulic control system according to the invention.

Referring to FIG. 1, a vehicle 1 has an active roll control system comprising a front roll bar 2 and a rear roll bar 3, each divided into two parts 2a, 2b, 3a, 3b rotatable relative to each other under the control of a hydraulic roll control actuator 4 to provide active roll control of the vehicle. Each actuator 4 comprises a double acting ram having working chambers 5, 6 on opposite sides of a piston 7 which are connected to a hydraulic control circuit 10 so that the pressures in them can be controlled to produce roll control moments in the front and rear roll bars 2, 3.

The hydraulic control circuit comprises a pump 12 for supplying hydraulic fluid under pressure from a reservoir 14, and a valve block 16 for controlling the distribution of hydraulic fluid to the actuators 4 and the return of fluid to the reservoir 14. The valve block has a first port 18 for receiving pressurised fluid from the pump 12 into a pressure line 18a in the block, and a second drain port 20 for the return of fluid to the reservoir 14 from a return line 20a in the block. The pressure and return lines 18a, 20a are interconnected by a diverter valve 22 which can allow fluid to flow from the pressure line 18a to the return line 20a to control the pressure drop between the pressure and return lines 18a, 20a as will be described in more detail below. Two further solenoid valves 24, 26 are provided in the valve block 16 which can selectively connect the pressure and return lines 18a, 20a to the working chambers 5, 6 of each of the hydraulic actuators 4 to control the roll moments produced.

A pressure transducer 28 produces a pressure signal indicative of the hydraulic pressure in the pressure line 18a, and a control unit 30 controls the valves 22, 24, 26 in response to the pressure signal to provide closed loop pressure control. The control unit 30 also receives signals from accelerometers 32 on the vehicle which indicate the lateral acceleration of the vehicle, and determines from these the pressure which needs to be applied across the actuators 4 to control the vehicle roll.

The pressure control valve 22 is biased open, and is closed for brief periods by a pulse width modulated (PWM) drive signal, the duty ratio of the PWM signal determining the proportion of the time that the valve is closed, and hence the rate at which fluid can flow through it. This therefore determines the pressure drop across the valve 22.

Figure 2:
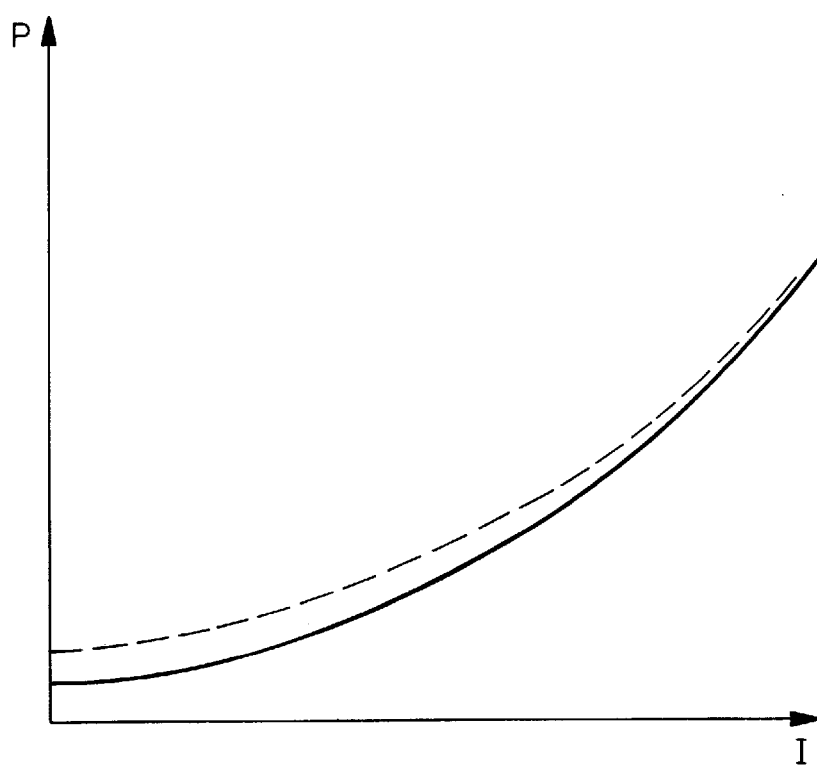
FIG. 2 shows the relationship between the driving current supplied to a pressure control valve of the system of FIG. 1 and the pressure drop it produces.

In FIG. 2, the pressure drop P across the pressure control valve 22 is shown as a function of mean drive current supplied to the pressure control valve. Since the valve 22 is biased open, zero current corresponds to the valve being permanently open. However, because the hydraulic fluid has a finite viscosity, there will always be a finite minimum pressure drop across the valve 22 when it is fully and permanently open. This minimum pressure drop is indicated in FIG. 2 by the point at which the curve meets the vertical pressure axis. Because the viscosity of the hydraulic fluid decreases with increasing temperature, the minimum pressure drop also varies with temperature. In FIG. 2, the solid line shows the oil pressure at relatively high temperatures, such as those experienced during normal running of the system, and the broken line shows pressures at a lower temperature such as might be experienced when the vehicle is first started up.

Figure 3:
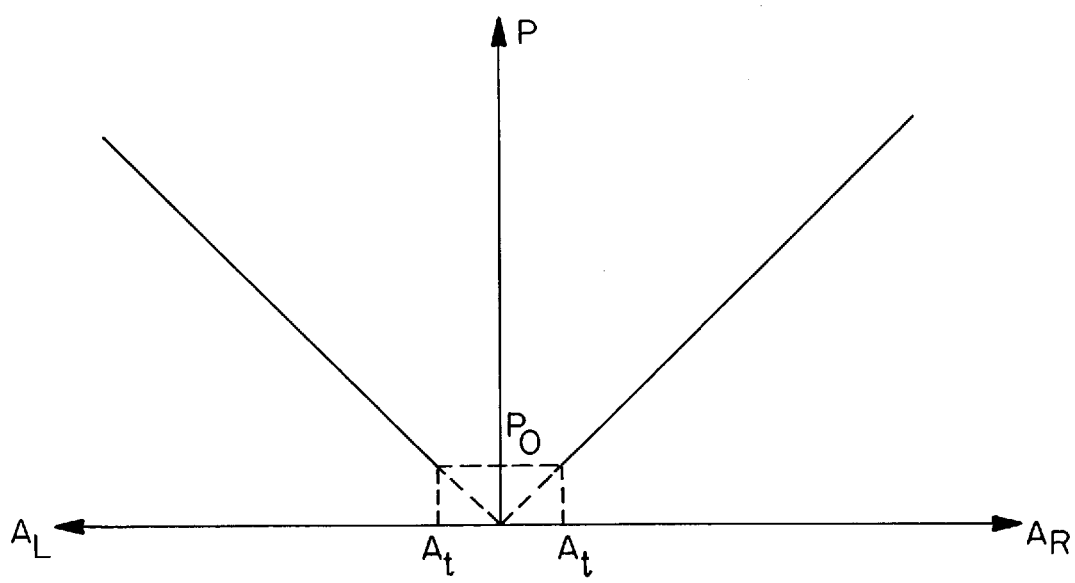
FIG. 3 shows the desired relationship between the lateral acceleration of the vehicle and the pressure applied to the roll control actuators in the system of FIG. 1.

Referring to FIG. 3, the desired pressure drop across the valve 22, i.e. the desired pressure P to be applied across the roll control actuators 4, varies in a known manner with lateral acceleration A of the vehicle, depending on the roll control characteristics required. Ideally the pressure would be infinitely variable from zero up to the maximum available from the pump 12. However, because of the minimum pressure drop across the pressure control valve 22, pressures below the minimum pressure $P_0$ cannot be applied. The control unit 30 is therefore arranged to apply no pressure across the actuators 4, and therefore to provide no active roll control, until the lateral acceleration reaches a threshold level $A_t$ i.e. until the desired roll compensation moment reaches the minimum level which can be provided. This leaves a deadband of lateral acceleration, and a corresponding deadband of roll control moment, in which no active roll control can be provided.

Therefore, in order to improve the responsiveness of the system, the control unit 30 is arranged to monitor the temperature of the valve block to determine the minimum pressure which can be applied to the actuators 4; so that it can provide roll control right down to the minimum possible level. The manner in which the temperature monitoring is carried out will now be described.

Figure 4:
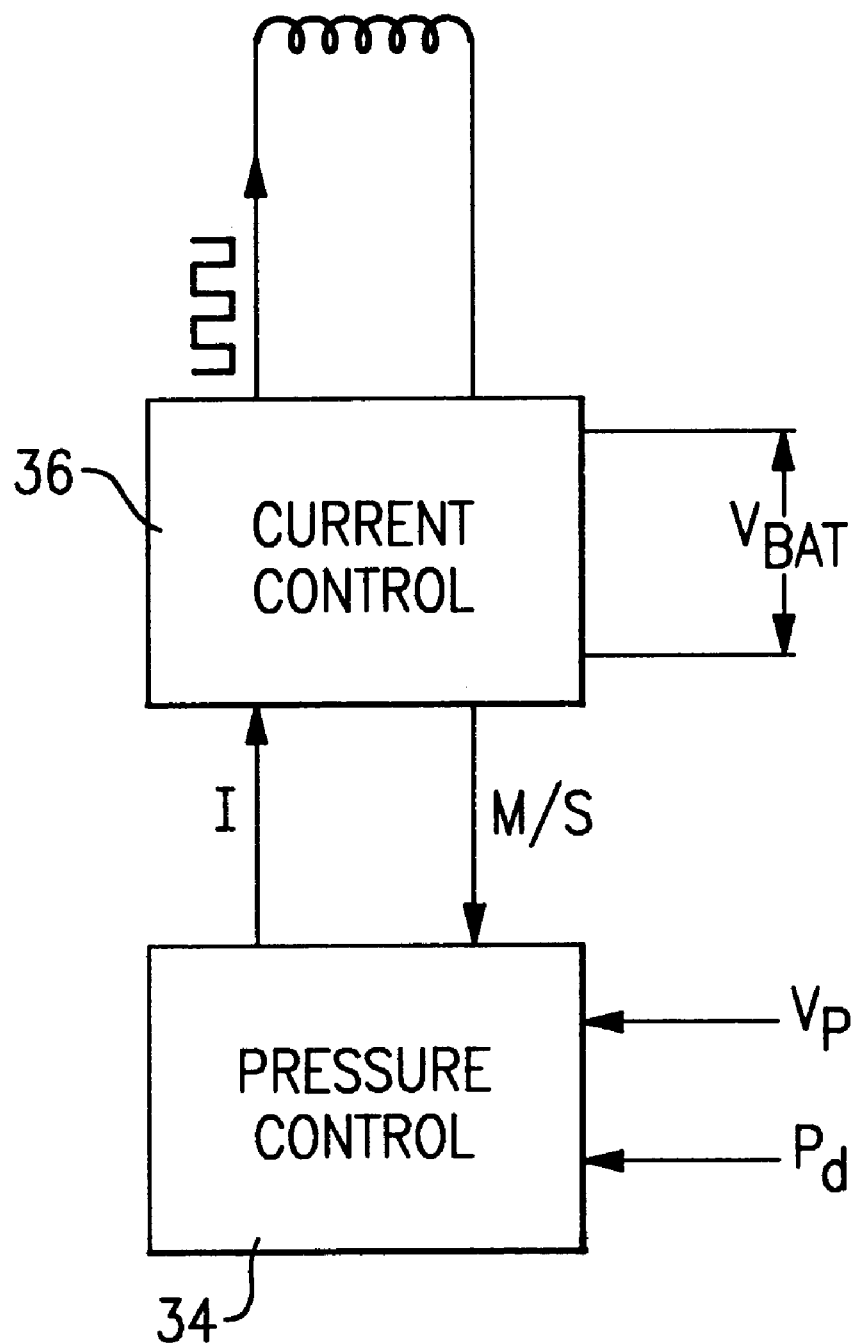
FIG. 4 shows the functional operation of part of the control unit of the system of FIG. 1.

Referring to FIG. 4, the control unit can be considered as a number of functional blocks. A pressure control block 34 receives a signal $P_d$ indicative of the desired pressure drop between the pressure line 18a and the return line 20a, and another signal V(P) which is the output signal from the pressure transducer 28. From the difference between the measured pressure and the desired pressure it produces a signal I which indicates the mean current which needs to be supplied to the solenoid 22a of the diverter valve 22 to produce the desired pressure at the first port 18.

A current control block 36 receives the signal I and also has inputs connected to a battery voltage $V_{bat}$. It applies the battery voltage across the solenoid 22a as a pulsed signal, monitors the driving current flowing through the solenoid as a result, and modulates the pulse width so as to produce the total current corresponding to the signal I from the pressure control block. The current control block sends a signal M/S back to the pressure control block indicative of the mark to space (or duty) ratio of the driving current.

Because the electrical resistance of the solenoid 22a is temperature dependent, the duty ratio of the solenoid driving current required to produce a given mean current varies with the temperature of the solenoid. Therefore, because the valve block is a good thermal conductor, and the temperature of the hydraulic fluid passing through the pressure control valve 22 will always be approximately equal to that of the solenoid 22a, the pressure control block 36 can determine the temperature of the hydraulic fluid from the relationship between the signal I and the signal M/S.

It will be appreciated that, as an alternative to the temperature measurement method described above, a separate thermometer could be provided for determining the temperature of the hydraulic fluid.

We claim:

1. A vehicle suspension system comprising a hydraulic actuator for producing an actuating force, a source of hydraulic pressure and a drain, a pressure control valve for controlling the flow of hydraulic fluid from the source to the drain thereby to provide a controlled hydraulic pressure drop between the source and the drain, which pressure drop has a minimum value, at least one actuation control valve for connecting the actuator between the source and the drain such that said pressure drop controls the magnitude of the actuating force, and control means having an input arranged to define a desired actuating force and being arranged to operate the valves in response to said input, wherein the control means defines a minimum valve of the desired actuating force corresponding to the minimum pressure value of the drop which can be produced by the pressure control valve and is arranged to operate said at least one actuation control valve to connect the actuator between the source and the drain only when the desired actuating force is greater than said minimum actuating force, and to measure the temperature of at least one component of the hydraulic system and to determine the minimum pressure drop from said temperature.

2. A system according to claim 1 wherein the control means is arranged to produce a drive current for controlling at least one of the valves, the drive current having a temperature dependent characteristic, and to measure said temperature by monitoring said temperature dependent characteristic.

3. A system according to claim 2 wherein said at least one of the valves is the pressure control valve.

4. A system according to claim 1 wherein the actuator is a roll control actuator arranged to control vehicle roll produced by lateral vehicle acceleration, and the value of the minimum actuating force defines a deadband of low lateral accelerations for which roll control cannot be provided.

* * * * *